Oct. 23, 1956   K. D. ASHLEY ET AL   2,768,125
METHOD OF MANUFACTURING A FLUID TYPE HYDROFORMING CATALYST
Filed July 22, 1952
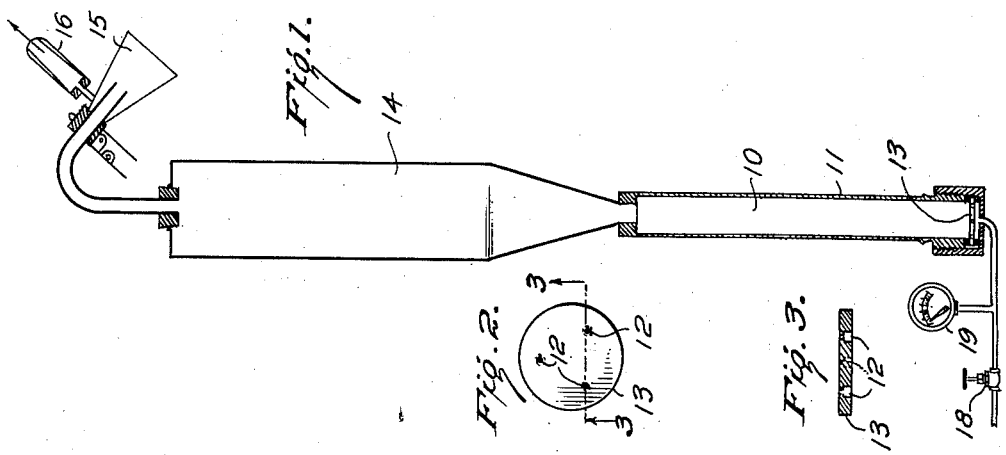
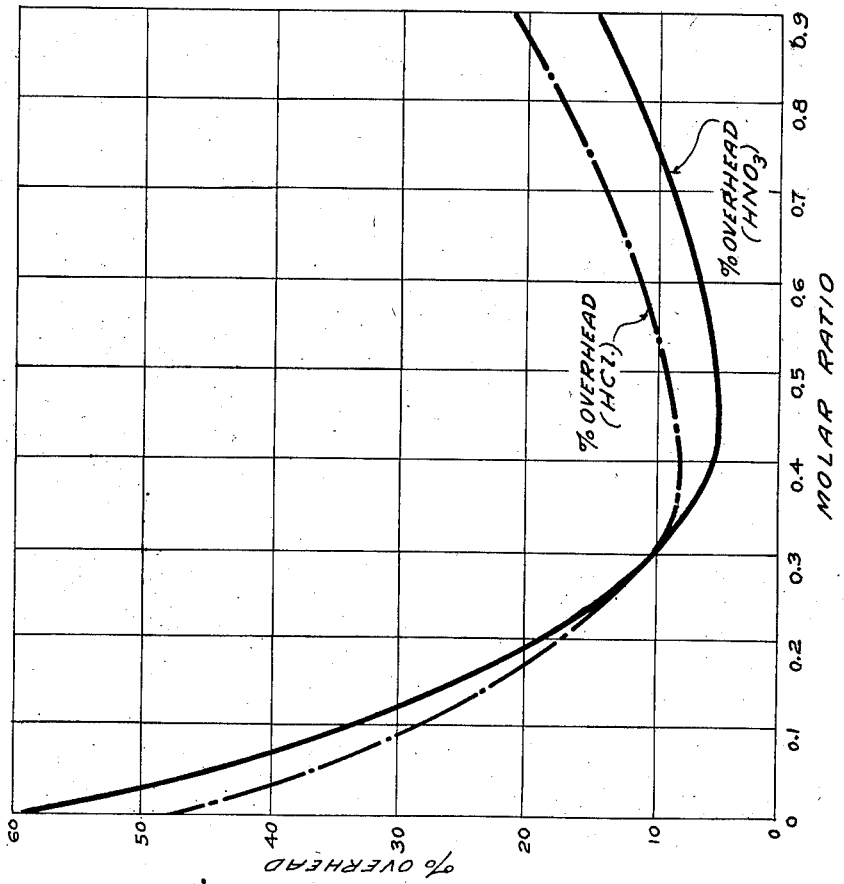
INVENTORS
KENNETH D. ASHLEY,
WILLIAM B. INNES,
THOMAS J. MALLEY,
BY Alexander T. Kardos.
ATTORNEY United States Patent Office 2,768,125
Patented Oct. 23, 1956

2,768,125

METHOD OF MANUFACTURING A FLUID TYPE HYDROFORMING CATALYST

Kenneth D. Ashley, William B. Innes, and Thomas J. Malley, Stamford, Conn., assignors to American Cyanamid Company, New York, N. Y., a corporation of Maine Application July 22, 1952, Serial No. 300,304

14 Claims. (Cl. 196—50)

This invention relates to attrition-resistant alumina gel-containing catalysts of increased longevity, to methods of producing the same, and to catalytic processes employing the same. More particularly, the present invention is concerned with fluid hydroforming catalysts comprising alumina gel and having one or more additional metal oxide catalysts or promoters therein and to methods of increasing the attrition resistance of such catalysts.

Various catalytic processes have been employed in the petroleum industry and the required characteristics and properties of the catalysts used therein are many and varied. For example, in one well known process, the fixed bed principle is used wherein the material to be processed is passed in gaseous form through a fixed catalyst bed in which the desired chemical changes occur. In such a process, two stationary catalyst beds are used and after one has been used for a period of time to catalyze the reaction involved and its activity has been reduced, the stream of the material to be processed is shifted to the other bed while the first bed undergoes a regenerative processing. As a consequence, the initial activity and the thermal stability of the catalysts are the most important characteristics and, since the catalyst is not moved about or subjected to any substantial physical handling, its strength or ruggedness is relatively immaterial.

In another well known process, the catalyst is in the form of coarse granules and either flows as a substantially compact mass or is mechanically conveyed in a movable bed in a continuous circulation between a reaction vessel through which the material to be processed is passed and a regeneration vessel wherein the de-activated catalyst particles are reactivated for further use. Here it is noted that there may be some relative movement of the coarse granules of catalysts with respect to each other or to the equipment and hence the catalytic granules may be exposed to some rubbing or wearing contact during the processing. Consequently, the strength or resistance to attrition of the catalyst becomes a factor to be considered along with the more important factors of catalyst activity and thermal stability.

On the other hand, however, in a fluid stream catalytic process, the catalyst is a solid, powdered material in very finely divided form and is maintained in a fluid or freely flowing condition at all times. Its fluidity is such that it is capable of being handled in very much the same way as a gaseous fluid and it is therefore normally mixed intimately with the materials undergoing the catalytic reaction and actually travels therewith through the various conduits, reactors, regenerators and separation equipment.

During its passage through these various devices, the very finely divided particles of catalyst continuously wear against each other and against the hard inner surfaces of such devices. Such frictional contacts subject the particles to considerable abrasive attrition with the result that they are fairly rapidly reduced to such a state of fineness as to lose their value in the fluid catalytic process. Consequently, in such a process, the strength, hardness and resistance to attrition are important factors to be considered along with activity and stability in determining the selection of a particular catalyst.

It is a principal object of the present invention to provide a method of producing an alumina gel-containing catalyst having excellent activity and stability and possessing superior attrition-resistance and having increased longevity when used in a fluid stream catalytic process or subjected to attritive forces in general.

It is well known that the activity of alumina gel catalysts for many purposes is a function of the specific surface of the catalyst and of its pore volume. Consequently, a more specific purpose of the present invention is to provide a method of producing an alumina gel-containing catalyst having a high specific surface, good pore volume, as well as a high resistance to attrition.

There are several methods for preparing alumina gel-containing catalysts suitable for use in catalytic processes. One method, as set forth in copending application Serial No. 148,979, filed March 10, 1950, now U. S. Patent 2,657,184 issued October 27, 1953, comprises the substantially simultaneous mixing of a sodium aluminate solution and a mineral acid under controlled pH conditions to form a slurry which may be washed and filtered to form a filter cake containing approximately 10–20% solids. This cake containing such solids in this relatively dispersed form may then be intimately intermixed with a metal compound, such as a solution or crystals of ammonium molybdate, for example, to form a mix or paste which may be heated, spray dried, calcined or otherwise dried, whereby the metal compound is converted to the oxide, which, in the case of ammonium molybdate, would be molybdenum oxide. The dried product, if a result of calcination rather than a spray drying process, may then be ground to a desired size or molded to any desired shape such as pellets, beads or the like and used in such a form.

Such a sodium aluminate-acid process represents considerable improvement over other processes hitherto used wherein aluminum hydroxide sols containing only about 4–5% solids are involved. Such other processes require the handling of very large quantities of dilute solutions and the drying of gels of low solids content. The commercial disadvantages and the plant requirements naturally render such other processes less desirable, particularly for large scale manufacture.

It is now known to treat the filter cake resulting from such a sodium aluminate-acid process containing the 10–20% solids with various peptizing agents such as water-soluble organic acids whereby alumina gel-containing catalysts characterized by a relatively large pore volume within the range of 0.3–0.5 cc. per gram and a correspondingly increased specific surface of up to 250 square meters per gram are obtained. Such values naturally increase their activity and stability and render them extremely advantageous in catalytic processes.

Such treatment, however, does not result in a corresponding increase in the hardness or resistance to attrition of the catalyst and consequently when the catalysts resulting from the sodium aluminate-acid process are used in a fluid stream catalytic process, they naturally wear away, as other catalysts do, inasmuch as they are also subject to the same frictional wearing and attrition therein.

It is therefore another principal purpose of the present invention to provide an alumina gel-containing catalyst resulting from a sodium aluminate-acid process, which catalysts shall have excellent resistance to attrition, in addition to high specific surface and good pore volume, so as to be especially suited for fluid catalytic or similar processes.

We have found that the method of producing the aluminum hydroxide has a profound effect on the specific surface of the alumina gel and on its pore volume and consequently on its catalytic activity and stability. We have further found that an aluminum hydroxide precipitate obtained by reacting an alkali metal aluminate solution with a mineral acid produces an alumina gel having an extremely high specific surface and good pore volume and will additionally possess an excellent resistance to attrition when it is treated in sufficiently dispersed form with an acid of the group consisting of hydrochloric acid and nitric acid in the proper concentrations and subsequently spray dried, calcined or otherwise reduced to a desired dryness.

Such hydrochloric acid or nitric acid treatment, however, must take place with the aluminum oxide in sufficiently dispersed form, such as in a filter cake possessing 10–20% solids, in order to obtain the desired increase in hardness and resistance to attrition. It has been found that, if such an acid treatment takes place on aluminum oxide in a solid lump form or even in a finely divided state, the properties of hardness and attrition resistance are not appreciably increased. Without being bound to any particular theory as to the distinction between such results, it is believed that the physical state of the catalyst while still in the filter cake stage is conducive to an increase in hardness, whereas the physical state of the dried lump or crystalline aluminum oxide precludes such increase of attrition resistance.

The amount of acid used to harden the alumina gel-containing catalyst may vary within wide ranges but it has been found that the hardening effect increases with an increase in the quantity of acid up to a specific value which exists at a molar ratio of acid to $Al_2O_3$ in the cake of approximately 0.4 and that the hardening effect decreases thereafter even though such molar ratio is increased. For the purposes of this invention, a molar ratio of acid to alumina of from about 0.1 to about 1.0 or more has been found to be satisfactory and capable of producing the hardness and strength requisite for proper attrition resistance.

In the accompanying drawing, I have illustrated a preferred design of apparatus for determining the relative values of the attrition resistance of catalysts or similar materials but it is to be understood that such is not limitative of the invention.

With reference to the accompanying drawing,

Figure 1 is a schematic showing of an attrition evaluation apparatus;

Figure 2 is a plan view of the perforated plate used in such apparatus;

Figure 3 is a cross-sectional view of the perforated plate taken on the line 3—3 of Figure 2; and Figure 4 is a graph depicting the relationship of the acid-$Al_2O_3$ molar ratio to the attrition or overhead percentage.

In order to evaluate the properties of the catalyst to determine its resistance to attrition the apparatus shown in Figures 1 to 3 was designed whereby the catalyst particles were exposed to the same general type of erosive and abrasive forces as those encountered in the commercial fluid cracking catalytic process.

A bed 10 of catalytic material is placed within a hollow cylinder 11 formed, for example, of brass or copper tubing, or the like, through which air streams are passed by means of openings 12 in a perforated plate 13 forming the bottom of the cylinder 11. These air streams enter the cylinder 11 at a high velocity and pass through the catalyst bed 10 with such force that particles of the catalytic material are carried upwardly therewith. In this way, the particles frictionally collide with each other and slide on the inner surfaces of the cylinder 11. This action approximately simulates the actual working conditions prevailing in commercial fluid catalytic processes and results in attrition conditions generally comparable thereto.

The air streams cause the catalyst to swirl upwardly and flow in fluid-like fashion to varying heights within an upper cylinder 14 which extends upwardly and axially from the cylinder 11. The heights to which the catalyst particles are urged upwardly by the air streams varies as their particle size or mass and the lengths of the cylinder 14 and cylinder 11 are so selected that only particles reduced to below a predetermined size will rise to the uppermost portions of the cylinder 14. The very fine particles resulting from the action of the attritive forces thus reach the very top of the cylinder 14 and are carried over by the air stream into a collection flask 15 and thimble 16 where they are collected and held until they can be removed and weighed in order to determine the amount of material reduced by attrition to such a fine size in any specified period of time.

The sizes and lengths of the cylinder 11 and cylinder 14 may be so selected that substantially any predetermined particle size or less is carried over and collected. For the purposes of the present invention it has been found advisable to provide for a particle size of 12 microns or under to be carried over into the collection flask 15 and thimble 16. It is to be appreciated, however, that the volume of the air stream may be so adjusted by control means 18 or the diameter of the tubing or cylinders may be so selected that other micron sizes may be collected.

Of course, it is to be realized that particle sizes of slightly larger than 12 microns are occasionally carried over into the flask 15 and thimble 16 during normal operation of the device but such particles form but a very small percentage of the entire mass carried over and collected, and do not affect the ultimate results to any great extent. In any event, however, since the results of these tests on various catalysts are on a comparative basis, such factors enter thereinto to substantially the same degree and are self-compensating and do not introduce any appreciable error.

The testing of a particular catalyst is as follows: a known amount of catalyst material of predetermined weight, such as a 50 gram sample, is placed in the lower hollow cylinder 11 and the air stream turned on to an accurately established standard rate of flow of air such as, for example, 15 cubic feet per hour as determined by the metering device, such as a rotameter, 19. Periodically, at any desired times, such as at 5 hours, 10 hours, 20 hours, or 40 hours, or more, as desired, the collecting flask 15 and thimble 16 are removed and emptied and the weight of the catalyst reduced to a particle size of 12 microns or less as determined. This weight may then be used to calculate the percent overhead and such a factor is indicative of the attrition resistance of the catalyst.

In such tests, the sample, as used, is selected without any preliminary screening or prior preparation and contains the normal percentage of fines. Consequently, the percent overhead for the first few hours is abnormally high and such should be considered in evaluating the results of such tests. Once the fines have been removed, then the test results are more truly indicative of the attrition resistance properties of the catalyst.

It is, of course, apparent that the lower this percentage of material carried over is, the higher is the attrition-resistance or hardness of the catalyst, and the more desirable it is for the fluid catalytic process.

The following table shows the results of the hardening effects of various acids on alumina gel-containing catalyst. Included in this table, for the purpose of comparison, are the values of the specific surface area and pore volume of the catalyst following the treatment of a filter cake possessing 10–20% solids resulting from the sodium aluminate-acid process.

Table I

| Acid | Molar Ratio, Acid/Al₂O₃ | Surface Area | Pore volume | Percent Overhead 10hrs. | 20hrs. | 40hrs. |
|---|---|---|---|---|---|---|
| Control (no acid) | | 190 | .56 | 58.0 | | |
| Nitric Acid 1 | 0.4 | 294 | .24 | 2.0 | 3.0 | 4.0 |
| Nitric Acid 2 | 0.4 | 259 | .24 | 3.8 | 5.5 | 7.8 |
| Nitric Acid 3 | 0.4 | 235 | .22 | 2.5 | 3.5 | 4.5 |
| Nitric Acid 4 | 0.4 | 235 | .22 | 5.5 | 6.5 | 7.5 |
| Maleic Anhydride | 0.2 | 348 | .45 | 27.0 | 35.0 | |
| Acetic | 0.75 | 311 | .43 | 30.0 | 40.0 | |
| Formic | 0.7 | | | 31.6 | 48.0 | |
| Glycolic | 0.4 | 357 | .52 | 45.0 | 58.0 | |
| Oxalic | 0.3 | 288 | | 53.5 | | |

As used herein, nitric acid 1 and 2 refer to a catalyst which has been hardened with nitric acid and spray dried, whereas nitric acid 3 and 4 refer to a catalyst which has been hardened with nitric acid and dried by heating and calcining, followed by grinding to size.

The remarkable reduction in the percentage overhead of the catalysts treated with nitric acid is brought out most clearly in the last three columns of Table I wherein the loss due to attrition of the catalysts treated with nitric acid was lower after forty hours than the catalyst treated with other acids after only 10 hours.

The results of other attrition-resistance tests on other standard commercial catalysts as compared to catalysts treated with nitric acid in accordance with the present invention is as follows:

Table II

| | Molar Ratio, Acid/Al₂O₃ | Surface Area | Pore volume | Percent Overhead 10hrs. | 20hrs. | 40hrs. |
|---|---|---|---|---|---|---|
| Nitric Acid 1 | .4 | 294 | .24 | 2.0 | 3.0 | 4.0 |
| Nitric Acid 2 | .4 | 259 | .24 | 3.8 | 5.5 | 7.8 |
| Nitric Acid 3 | .4 | 235 | .22 | 2.5 | 3.5 | 4.5 |
| Nitric Acid 4 | .4 | 235 | .22 | 5.5 | 6.5 | 7.5 |
| Commercial Brand A | | 114 | .21 | 45.0 | 60.0 | 65.0 |
| Do | | 100 | .21 | 37.0 | 47.0 | 55.0 |
| Commercial Brand B | | 130 | .22 | 17.0 | 21.0 | 32.0 |
| Do | | 132 | .22 | 16.0 | 28.0 | 41.0 |

Again, the remarkable reduction in the percentage overhead of the catalysts treated with nitric acid is to be observed in the last three columns of Table II.

The effect of the variation of the molar ratio of hydrochloric acid and nitric acid to Al₂O₃ on the attrition resistance of the catalyst is set forth in the following tables wherein the effect on the pore volume and surface area is also included to show a similar parallelism in action.

Table III

| Acid | Molar Ratio, Acid/Al₂O₃ | S. A. | P. V. | Percent Overhead 10 hrs. | 20 hrs. | 40 hrs. |
|---|---|---|---|---|---|---|
| None (control) | 0.00 | 190 | 0.56 | 58.0 | | 34.0 |
| Nitric Acid 4 | .18 | 234 | .32 | 19.0 | 25.0 | 26.0 |
| Do | .25 | 268 | .21 | 17.0 | 22.0 | 10.2 |
| Do | .33 | 266 | .23 | | 7.6 | 7.5 |
| Do | .40 | 235 | .22 | 5.5 | 6.5 | 10.5 |
| Do | .55 | 234 | .25 | 7.0 | 8.7 | 14.9 |
| Do | .70 | 205 | .29 | 8.1 | 10.7 | 20.5 |
| Do | .85 | 247 | .26 | 12.5 | 16.2 | |
| None (control) | 0.0 | 190 | 0.56 | 58.0 | | |
| Hydrochloric Acid | 0.1 | 220 | 0.38 | 28.5 | 38.5 | |
| Do | 0.3 | 219 | 0.27 | 9.0 | 11.5 | 13.6 |
| Do | 0.6 | 212 | 0.29 | 13.5 | 19.0 | 24.0 |
| Do | 0.8 | 212 | 0.33 | 16.0 | 21.0 | 26.0 |

The results set forth in Table III have been graphically reproduced in Figure 4 wherein the molar ratio of the acid used per mole of Al₂O₃ has been plotted against the values of the percent overhead for nitric acid and for hydrochloric acid. The particular values selected for graphical representation are those obtained for a 10 hour attrition test period.

In the manufacture of coated or impregnated alumina hydroforming catalysts, it is common practice and usually advantageous to include in the alumina gel-containing catalyst one or more polyvalent metal oxides, such as an oxide of a metal of the fifth, sixth and eighth groups of the periodic system. Thus, for example, one of the better classes of hydroforming catalysts as produced by the methods of the present invention is one in which 2–15% and preferably about 4–12% of molybdenum oxide, as based on the weight of the finished catalyst, is incorporated in the alumina prior to the drying and calcining thereof. Chromium oxide, in amounts ranging from about 2% to about 30% of the weight of the finished catalyst, is also frequently used. Other oxides, such as those of tungsten, vanadium, cobalt, nickel, platinum, palladium, etc., may be used in similar percentages. Any one or more of these or other similar metal oxides can be incorporated with the hardened aluminum hydroxide in carrying out the principles of our invention.

From the foregoing, it will be seen that our invention consists in the production of aluminum oxide gel catalysts by the hardening with nitric acid of an aluminum hydroxide precipitate in the form of a filter cake having a solids content of 10–20%, this precipitate having been obtained by the action of an acid on an alkali metal aluminate. The catalysts produced by the methods of our invention are characterized by high surface area, good pore volume and by very high attrition resistance. Furthermore, the invention includes and relates to the improved catalytic materials having such advantageous properties and to the use of such catalysts in fluid catalytic processes.

The invention will be further described in greater detail by the following specific examples. It is to be understod, however, that, although these examples may describe in particular detail some of the specific features of the invention, they are given primarily for purposes of illustration and the invention in its broader aspects is not to be construed as limited thereto.

Example 1

A sodium aluminate solution was prepared by digesting 200 pounds of B. O. C. (crystalline aluminum trihydrate containing 65% Al₂O₃) with 240 pounds of 50% NaOH solution at 110–120° C. and diluting to 23% Al₂O₃ with 127 pounds of water. 670 pounds of water was charged to an agitated vessel and the above solution added in a thin stream simultaneously with 715 pounds of 31% HNO₃ at a pH of 6.8–7.2. The resulting slurry, containing 6.7% Al₂O₃ was filtered and washed with demineralized water to a sodium salt content of less than 0.01 Na₂O on a total solids basis. The filter cake contained 14.1% solids by weight.

To 320 pounds of this filter cake, there was added at room temperature 16.2 pounds of 69.4% HNO₃, this being equivalent to 0.4 mol of acid per mol of alumina. After thorough mixing, 41 pounds of a 15% solution of ammonium molybdate was added, and the mixture heated to 70° C. with thorough mixing for a period of one hour. The mix was then calcined in a direct fired rotary kiln at 900° F. The calcined material was ground so that 95% passed through a 100 mesh screen and 55% through a 200 mesh screen. A sample of the ground material was then calcined at 1100° F. for one hour. The attrition (% overhead) was 5.5% in 10 hours, 6.5% in 20 hours and 7.5% in 40 hours. The specific surface was 210 square meters per gram and the pore volume was 0.22 cc. per gram.

Example 2

To 426 pounds of alumina filter cake prepared as in Example 1, but containing 14.5% solids, was added, with thorough mixing, 24.7 pounds of 61.7% HNO₃, equivalent to 0.4 mol of acid per mol of alumina. 51.3 pounds of 15% ammonium molybdate was then added and the mix was heated at 70° C. for one hour.

The material was then spray dried in an 18' spray dryer from a 7" diameter, V-type wheel turning at 10,500 R. P. M. It was then calcined in an indirect-fired rotary kiln at 900° F. The particle size was 98% through 100 mesh screen and 55% through 200 mesh screen. A sample of this material was calcined at 1100° F. for one hour. The attrition (percent overhead) was 3.8% in 10 hours, 5.5% in 20 hours, and 7.8% in 40 hours. The specific surface was 259 square meters per gram and the pore volume was 0.24 cc. per gram.

*Example 3*

To 250 pounds of filter cake prepared as in Example 1 but containing 14.6% solids, was added, with thorough mixing, 22.7 pounds of 69.9% HNO3, equivalent to 0.7 mol acid per mol of alumina. To this was added 30 pounds of a 15% ammonium molybdate solution with thorough mixing and the mix heated to 70° C. for one hour. The mix was then calcined in a direct-fired rotary kiln at 700° F., ground and then calcined at 1100° F. for one hour. The attrition (percent overhead) was 8.1% in 10 hours, 10.7% in 20 hours and 14.9% in 40 hours. The specific surface was 205 square meters per gram and the pore volume was 0.29 cc. per gram.

*Example 4*

A mix was made without a HNO3 hardening treatment in the following manner. To 10 pounds of filter cake prepared as in Example 1, but containing 15.3% solids, was added 665 grams of a 15% ammonium molybdate solution with thorough agitation. The mix was heated to 70° C. for one hour. It was then calcined at 900° F. in an indirect-fired rotary kiln, ground and a sample calcined at 1100° F. for one hour. The attrition (percent overhead) was 58% in five hours, the specific area was 190 square meters per gram, and the pore volume 0.56 per gram. Such high percentage of overhead clearly indicates the loss in attrition-resistance over the preparations of Examples 1–3 wherein a hardening treatment with HNO3 was included.

The fluent attrition-resistant alumina gel-containing catalysts of the present invention are particularly advantageously used in the hydroforming or the catalytic dehydrogenation of vaporizable normally liquid petroleum hydrocarbons or hydrocarbon fractions usually boiling under atmospheric pressure within the gasoline boiling range or in the range 70°–200° C. or above. Such processes are particularly useful in the conversion of $C_6$ and higher normal paraffins and six-carbon ring naphthenes into aromatics and are especially of applicability to fractions of naphtha.

Although we have described but a few specific examples of our inventive concept, we consider the broad aspects of the same not to be limited to the specific substances mentioned therein but to include various other compounds of equivalent function and constitution as set forth in the claims appended hereto. It is understood that any suitable changes, modifications and variations may be made without departing from the spirit and scope of the invention.

What we claim is:

1. A method of producing an alumina gel-containing catalyst of high resistance to attrition which comprises precipitating aluminum hydroxide gel from an alkali metal aluminate solution by reacting it with a mineral acid, filtering and washing the aluminum hydroxide gel so produced, mixing the resulting filter cake containing the aluminum hydroxide gel in dispersed form with a quantity of an acid of the group consisting of hydrochloric acid and nitric acid within the range of 0.1 to 1.0 mol of acid per mole of $Al_2O_3$ in the filter cake to form a paste, incorporating 2–30% of an oxide of a polyvalent metal selected from the group consisting of molybdenum, chromium, tungsten, vanadium, cobalt, nickel, platinum and palladium into said paste, and drying the same.

2. A method as defined in claim 1 wherein the polyvalent metal oxide is molybdenum oxide.

3. A method as defined in claim 1 wherein the polyvalent metal oxide is chromium oxide.

4. A method as defined in claim 1 wherein the acid is hydrochloric acid.

5. A method as defined in claim 1 wherein the acid is nitric acid.

6. A method of producing an alumina gel-containing catalyst of high resistance to attrition which comprises precipitating aluminum hydroxide gel from an alkali metal aluminate solution by reacting it with a mineral acid, filtering and washing the aluminum hydroxide gel so produced and thereby forming a washed filter cake of 10–20% solids, mixing the resulting filter cake containing aluminum hydroxide gel in dispersed form in an amount between 10% and about 20% solids with a quantity of an acid of the group consisting of hydrochloric acid and nitric acid within the range of 0.1 to 1.0 mole of acid per mole of $Al_2O_3$ in the filter cake to form a paste, incorporating 2–30% of an oxide of a polyvalent metal selected from the group consisting of molybdenum, chromium, tungsten, vanadium, cobalt, nickel, platinum and palladium into said paste, and drying the same.

7. A method as defined in claim 6 wherein the polyvalent metal oxide is molybdenum oxide.

8. A method as defined in claim 6 wherein the polyvalent metal oxide is chromium oxide.

9. A method as defined in claim 6 wherein the acid is hydrochloric acid.

10. A method as defined in claim 6 wherein the acid is nitric acid.

11. An alumina gel-containing catalyst of high resistance to attrition produced by the method of claim 1.

12. In a method of producing a material suitable for conversion into an alumina gel-containing catalyst of high resistance to attrition the steps of precipitating aluminum hydroxide from an alkali metal aluminate solution by reaction of the same with a mineral acid, filtering and washing the aluminum hydroxide so produced, and mixing the resulting filter cake with a quantity of an acid of the group consisting of hydrochloric acid and nitric acid within the range of 0.1 to 1.0 mol of acid per mol of $Al_2O_3$ in the filter cake.

13. A method of producing a fluidized alumina gel-containing catalyst of high resistance to attrition which comprises precipitating aluminum hydroxide gel from an alkali metal aluminate solution by reacting it with a mineral acid, filtering and washing the aluminum hydroxide gel so produced, mixing the resulting filter cake containing aluminum hydroxide gel in dispersed form with a quantity of an acid of the group consisting of hydrochloric acid and nitric acid within the range of 0.1 to 1.0 mol of acid per mole of $Al_2O_3$ in the filter cake to form a paste, incorporating therein from about 2 to about 30% of an oxide of a polyvalent metal selected from the group consisting of molybdenum, chromium, tungsten, vanadium, cobalt, nickel, platinum and palladium and spray drying the same.

14. A method of producing a fluidized alumina gel-containing catalyst of high resistance to attrition which comprises precipitating aluminum hydroxide gel from an alkali metal aluminate solution by reacting it with a mineral acid, filtering and washing the aluminum hydroxide gel so produced, mixing the resulting filter cake containing aluminum hydroxide gel in dispersed form with a quantity of an acid of the group consisting of hydrochloric acid and nitric acid within the range of 0.1 to 1.0 mol of acid per mol of $Al_2O_3$ in the filter cake to form a paste, incorporating therein from about 2 to about 30% of an oxide of a polyvalent metal selected from the group consisting of molybdenum, chromium, tungsten, vanadium, cobalt, nickel, platinum and palladium to form a slurry, heating the slurry, spray drying the same, and calcining to form a fluidized catalyst.

References Cited in the file of this patent

UNITED STATES PATENTS

| | | |
|---|---|---|
| 2,367,263 | Brown | Jan. 16, 1945 |
| 2,404,024 | Bailie et al. | July 16, 1946 |
| 2,406,420 | Weiser et al. | Aug. 27, 1946 |
| 2,454,724 | Tamele et al. | Nov. 23, 1948 |
| 2,638,455 | Pitzer | May 12, 1953 |
| 2,657,184 | Ashley | Oct. 27, 1953 |
| 2,706,209 | Reitz et al. | Apr. 12, 1955 |